July 29, 1924.

G. A. CASE 1,503,264

PNEUMATIC VEHICLE DRIVE

Filed Feb. 27, 1923

Inventor
Geo. A. Case
E. W. Anderson Son.

By

Attorney

July 29, 1924.
G. A. CASE
1,503,264
PNEUMATIC VEHICLE DRIVE
Filed Feb. 27, 1923    3 Sheets-Sheet 3
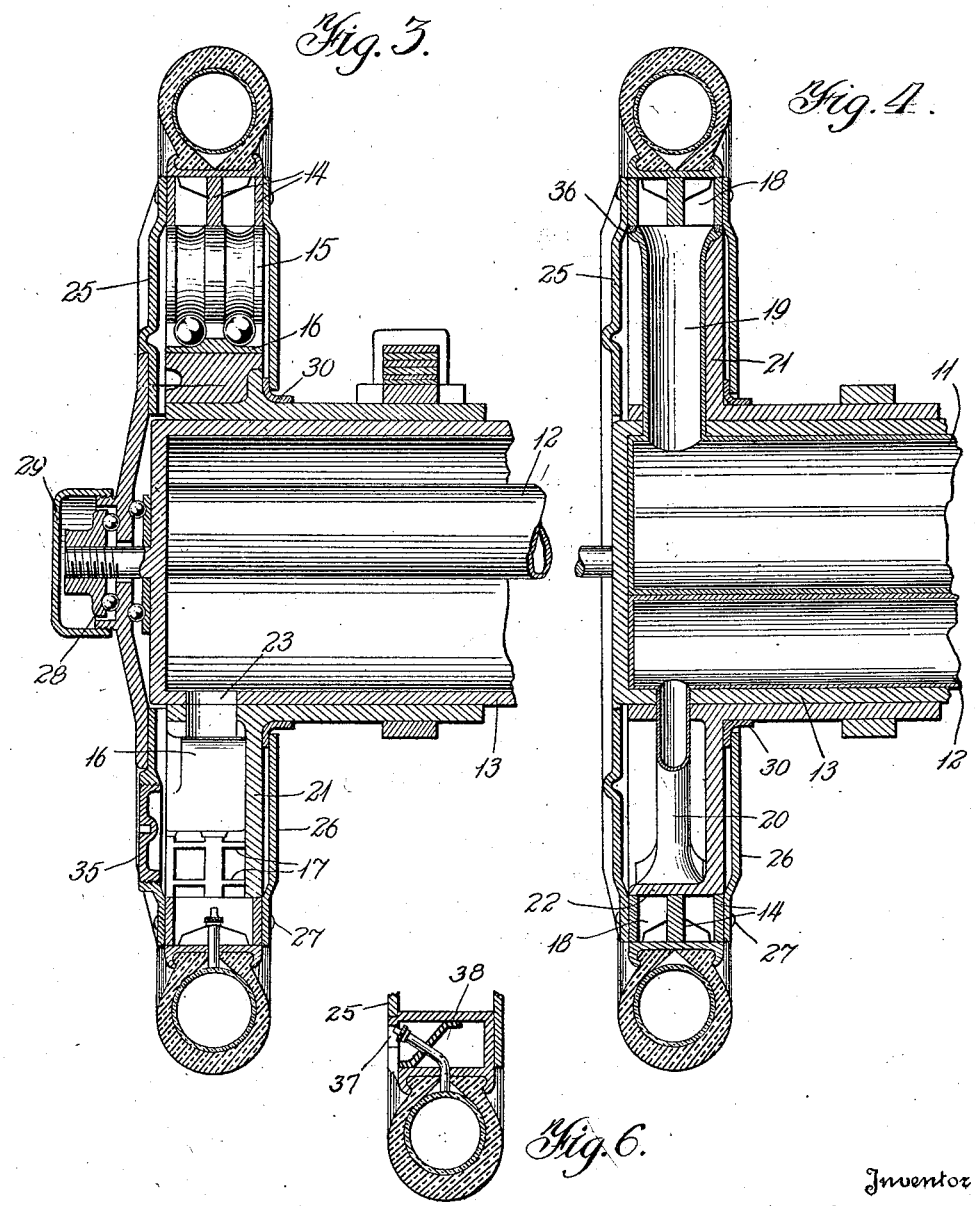
Inventor
Geo. A. Case
By E. W. Anderson
Attorney Patented July 29, 1924.

1,503,264

UNITED STATES PATENT OFFICE.

GEORGE A. CASE, OF JOPLIN, MISSOURI.

PNEUMATIC VEHICLE DRIVE.

Application filed February 27, 1923. Serial No. 621,691.

*To all whom it may concern:*

Be it known that I, GEORGE A. CASE, a citizen of the United States, residing at Joplin, in the county of Jasper and State of Missouri, have made a certain new and useful Invention in Pneumatic Vehicle Drives, of which the following is a specification.

The invention has relation to fluid propulsion means for vehicles, having for an object the provision of a complete vehicle-carried unit for compressing a fluid medium and for applying such compressed medium to the propulsion of a vehicle. A further object of the invention is the direct application of a fluid propulsion medium to a traction wheel of a vehicle, whereby all mechanical driving members are eliminated. Other objects and advantages will hereinafter appear.

The invention consists in the novel construction and combination of parts, as hereinafter set forth, and illustrated in the accompanying drawings, in which:

Figure 3 is a section taken on the line 3—3, Figure 2.

Figure 4 is a section taken on the line 4—4, Figure 2.

Figure 6 is a detail cross-section of the rim and tire, showing a modified arrangement of the inflation valve.

Figure 1:
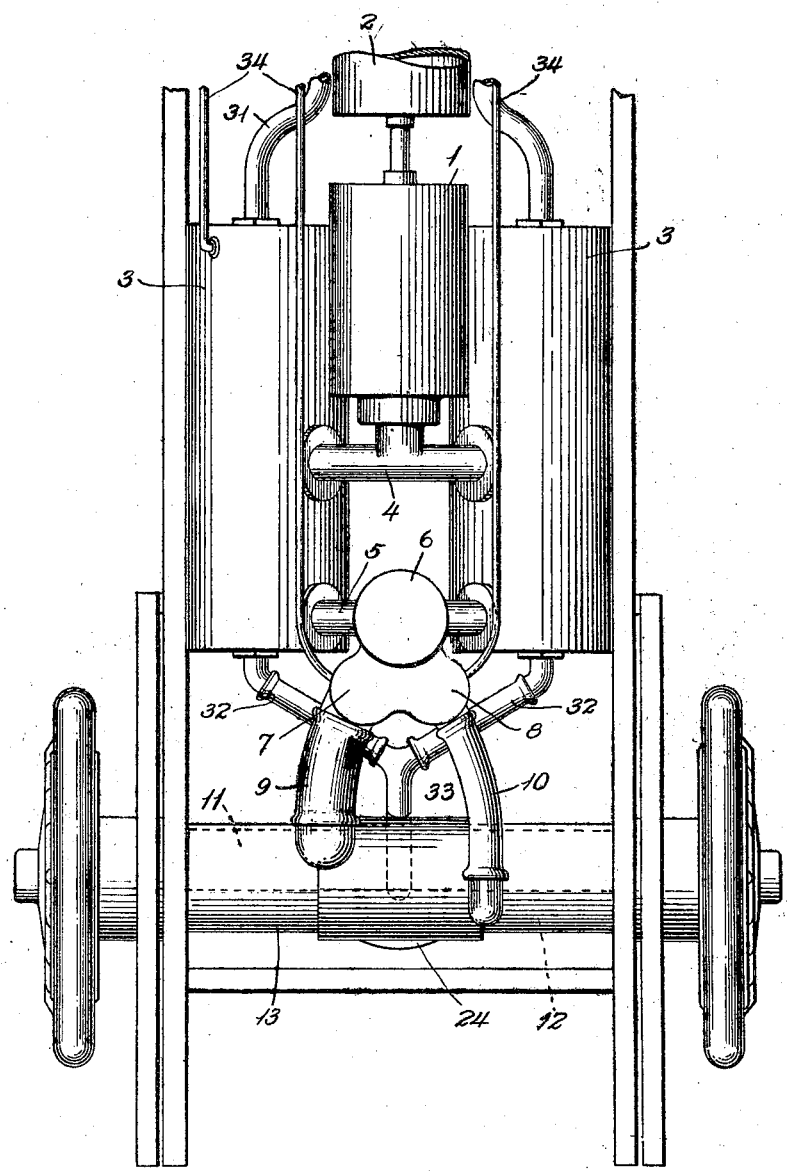
Figure 1 is a plan view of a portion of a vehicle, equipped with propulsion means in accordance with the present invention.
Figure 2:
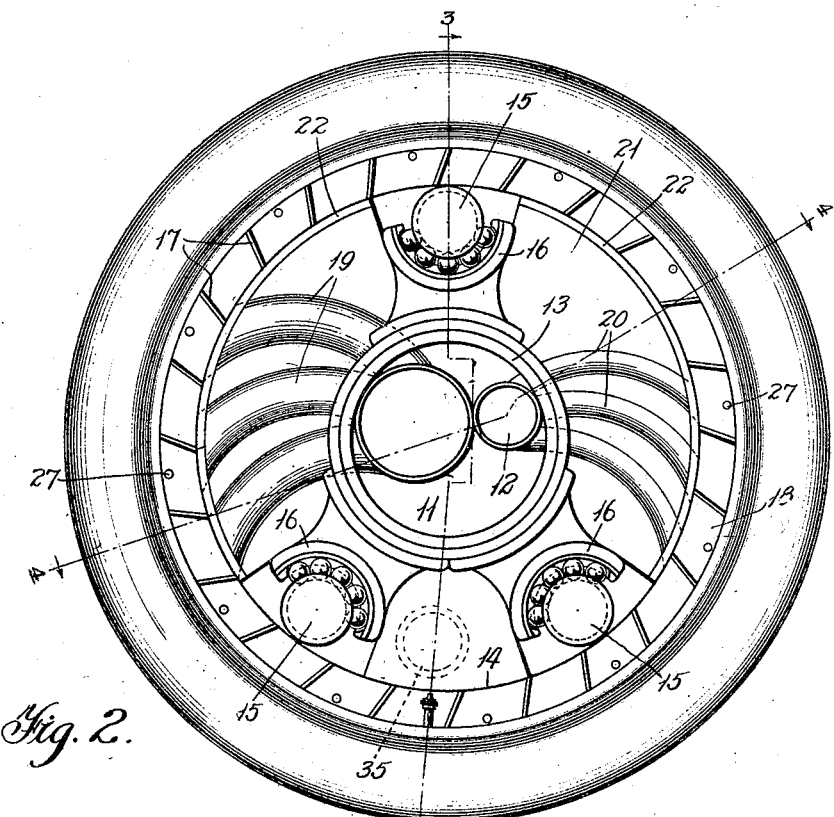
Figure 2 is a side view of one of the driving wheels, with the cover disk removed.
Figure 5:
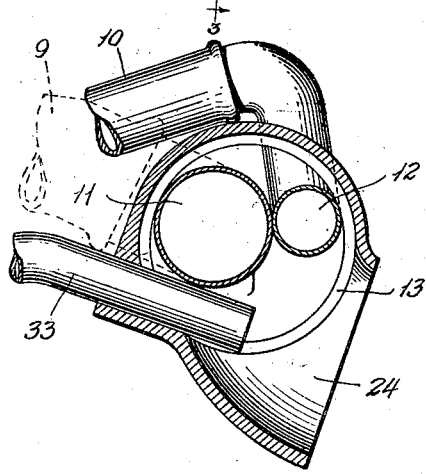
Figure 5 is a central cross-section through the dead axle, showing the exhaust pipe arrangement.

In the accompanying drawings, illustrating one embodiment of the invention, the numeral 1 designates a compressor, mounted upon the vehicle frame and driven from a suitable gasoline engine 2. Storage tanks 3 communicate with the compressor by pipes 4, and serve to supply compressed air to the drive wheels of the vehicle, through the conducting passages now to be described. Pipes 5 lead from the tanks to a reducing valve 6, whence the air, under reduced pressure, is admitted through throttle valves 7 and 8 to flexible hose 9 and 10, the former communicating with a forward drive supply pipe 11, and the hose 10 communicating with a smaller reverse drive supply pipe 12, both contained in the tubular dead axle 13.

The rim of each drive wheel carries an internal bearing track composed of three annular members 14, upon which bear rollers 15 carried in bearings 16 spaced at intervals about the dead axle and connected therewith. The two lower rollers 15 support the load, while the upper roller holds the rim in position. The rollers are mounted in any suitable manner, as in double ball bearing seats, which serve to hold the rollers in true alignment.

Between the annular bearing members 14 are provided a series of turbine blades 17, these blades intersecting and serving to brace the annuli 14, in connection with which they form pockets 18 about the inner face of the rim. Jet tubes 19 communicate with the pipe 11 and are adapted to direct a blast of air downwardly against the blades 17, forwardly of the axle 13, producing forward motion; while similar tubes 20 communicate with the pipe 12 and direct an air blast downwardly upon the blades in rear of the axle, providing for reverse motion. A dead axle plate 21 has a collar member surrounding the axle 13 and a disk member carrying forward and rear flanges 22, adapted to close in the pockets 18 as they come adjacent to the tubes 19 and 20, the upper and lower spaces between these flanges allowing the escape of the compressed air, which is conducted through ports 23 in the dead axle to the interior of the latter, btween the pipes 11 and 12, and allowed to escape through port 24.

Disks 25 and 26, bolted to the annuli 14 at 27, complete the wheel, the outer disk 25 having a suitable thrust bearing connection 28 with the dead axle, provided with a hub cap 29. Inner disk 26 may be provided with the usual felt washer 30, serving as a dust guard and sealing the interior of the wheel.

Preferably, the tanks 3 are jacketed and the exhaust of the gasoline engine communicates with the jacket space by means of pipes 31, whereby the air is preheated before delivery to the turbines. From the jackets of tanks 3 the exhaust is conducted by flexible hose 32 to a discharge jet 33, intersecting the tubular axle 13 and opening in line with the port 24, through which port the exhaust gases will aid in discharging the air from the turbines.

The throttle valves 7 and 8 may be controlled by compressed air, in the well-known manner, pipes 34 connecting the valves with the compressed air supply for this purpose, through a suitable controlling valve.

Where pneumatic tires are used, the filling valve may penetrate the rim in the usual way, a hand hole 35 being provided in the disk 25 to provide access to the valve. Or the disk 25 may be cut away at 37 and the space 38 between the adjoining pockets 18 bridged over to prevent the escape of air and to provide a continuous runway for the rollers 15.

The ends of the tubes 19 and 20 penetrate the flanges 22, and are provided with gaskets 36 whereby an airtight contact with the annuli 14 is secured. Any of the various pipe connections above described may consist of lengths of flexible hose, in order to avoid strain upon the joints which might result in leakage, and check valves may be placed as found desirable, to prevent loss of power by back pressure.

Any desired number of storage tanks may be used, and these may be located as found most convenient.

While the invention has been illustrated as applied to an automobile, it is obvious that it is adaptable to a number of uses, such, for instance as upon railway trains.

By the use of the invention the loss of power through friction is practically eliminated; the stored power is instantly available, even though the engine has become stalled; the speed control is absolutely flexible; the reverse drive may be used in stopping, relieving the brake of wear and tear; the power being applied at a considerable distance from the axis of the wheel, great leverage is attained, and the load, being balanced upon the two lower rollers of the wheel, is carried in the most efficient manner.

I claim:—

A driving wheel for pneumatically impelled vehicles, comprising a rim, turbine blades mounted upon said rim, an annular bearing member upon said rim intersecting said blades, a tubular dead axle, an inner non-revoluble member mounted thereon, bearing devices upon said non-revoluble member contacting with said bearing member, and pressure fluid tubes within said dead axle and nozzles communicating with said tubes and directed toward the blades.

In testimony whereof I affix my signature in presence of two witnesses.

GEORGE A. CASE.

Witnesses:
A. W. THURMAN,
PAUL G. KOONTZ.